(12) United States Patent
Beneker et al.

(10) Patent No.: US 8,267,584 B2
(45) Date of Patent: Sep. 18, 2012

(54) RAIL OF A LONGITUDINAL GUIDE WITH A BEARING BLOCK OF A LONGITUDINAL GUIDE AND A PIVOTAL FLAP

(75) Inventors: Wilfried Beneker, Leichlingen (DE); Antal Teer, Mettmann (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 594 days.

(21) Appl. No.: 12/580,841

(22) Filed: Oct. 16, 2009

(65) Prior Publication Data
US 2010/0098357 A1    Apr. 22, 2010

(30) Foreign Application Priority Data

Oct. 18, 2008  (DE) .................. 10 2008 051 721

(51) Int. Cl.
*B60N 2/07*  (2006.01)
*F16M 13/00*  (2006.01)
(52) U.S. Cl. .............................. 384/34; 384/47; 248/430
(58) Field of Classification Search .................. 384/34, 384/47; 248/424, 429, 430; 297/341
See application file for complete search history.

(56) References Cited

U.S. PATENT DOCUMENTS

| | | | | |
|---|---|---|---|---|
| 4,190,226 A | * | 2/1980 | Letournoux et al. | 248/429 |
| 4,526,424 A | * | 7/1985 | Korth | 297/473 |
| 4,742,983 A | * | 5/1988 | Nihei | 248/429 |
| 4,821,991 A | * | 4/1989 | Aihara et al. | 248/430 |
| 5,167,393 A | * | 12/1992 | Hayakawa et al. | 248/430 |
| 5,567,013 A | * | 10/1996 | Chang | 297/341 |
| 5,918,847 A | * | 7/1999 | Couasnon | 248/430 |
| 6,231,022 B1 | * | 5/2001 | Becker et al. | 248/429 |
| RE37,990 E | * | 2/2003 | Yamada et al. | 248/430 |

FOREIGN PATENT DOCUMENTS

EP    0962356 B1    10/2008

* cited by examiner

*Primary Examiner* — Phillip A Johnson
(74) *Attorney, Agent, or Firm* — McCarter & English, LLP

(57) ABSTRACT

The rail of a longitudinal guide of a longitudinal adjustment device of a motor vehicle seat includes one rail profile, at least one bearing block including a bearing hole, a bearing shaft extending through the bearing hole and a flap, which is pivotal about the bearing shaft. The bearing block is made from the material of the rail profile by cutting out a border of the bearing block and by bending the thus obtained blank for the bearing block about a bending line.

15 Claims, 3 Drawing Sheets

RAIL OF A LONGITUDINAL GUIDE WITH A BEARING BLOCK OF A LONGITUDINAL GUIDE AND A PIVOTAL FLAP

CROSS-REFERENCE TO RELATED APPLICATIONS

This application claims priority to German Application No. DE 10 2008 051 721.6, filed Oct. 18, 2008, herein entirely incorporated by reference.

FIELD OF THE INVENTION

The invention relates to a rail of a longitudinal guide of a longitudinal adjustment device of a motor vehicle seat, which comprises one rail profile, at least one bearing block comprising a bearing hole, a bearing shaft extending through said bearing hole and a flap, which is pivotal about said bearing shaft.

BACKGROUND OF THE INVENTION

Such a rail is known from EP 962 356 B1, herein entirely incorporated by reference. On this rail, the bearing block is a separate component part. In the concrete exemplary embodiment, the bearing block is part of a component that is fastened to the seat rail. This component part forms two bearing blocks, each comprising a bearing hole. The two bearing holes are aligned. The alignment of the bearing holes extends parallel to the direction of displacement of the two rails of the longitudinal guide. A bearing shaft extends through the bearing holes. A flap is pivotal about this bearing shaft. The seat rail has an opening; the flap protrudes from said opening. In this way, movements can be transmitted from the outside into the interior of the longitudinal guide, for example for actuating a catch device as it can be seen in prior art.

A disadvantage of this prior art device is that an additional component part is needed, which must be manufactured separately from the rail. It must be connected to the rail, it being necessary to position the two parts to be connected. Manufacturing and mounting require several steps.

BRIEF SUMMARY OF THE INVENTION

In view thereof, the invention aims at further developing the prior art rail of the type mentioned herein above so that it comprises less component parts and is more simple to manufacture and to mount with less material.

In view of the rail of the type mentioned herein above, this object is solved in that the bearing block is made from the material of the rail profile by cutting clear the border of the bearing block and by bending a thus obtained bearing block blank about a bending line.

In accordance with the invention, the bearing block is made from the material of the rail profile itself. This has considerable advantages both in terms of manufacturing and of mounting, it also has advantages in terms of weight. Now, the bearing shaft can be disposed in closer proximity to the surface of the rail profile than in prior art. The present invention is more particularly suited in combination with an actuation unit of a motor vehicle seat as it has been filed with this title on Apr. 28, 2008 in Germany under the File No. 10 2008 021 123. A portion of a component part is inserted as the bearing shaft, said component part also realizing a spring, which acts between the flap and the rail profile. The bearing shaft has quite small a diameter, namely the diameter of usual springs, the diameter being for example about 2 mm.

Generally, an invention allows for constructing an adjustment device of a longitudinal adjustment device, such as an actuation unit for a catch of a longitudinal adjustment device, so that it is significantly smaller and has less component parts. One thereby also has the advantage that making an opening in the rail profile, which is needed anyway, is now combined with the cutting of the border of the bearing block. The flap protrudes through this opening.

It has been found particularly advantageous to make the bearing hole so that it extends through the bending line into the undisturbed region of the rail profile. It is located on either side of the bending line. If one utilizes rod-shaped spring material as the bearing shaft, which is preferred, the bearing hole has a small diameter. To manufacture such a diameter with a usual tool (punching tool) such as a cutting punch means that the cutting punch has relatively small dimensions. Such type cutting punches have a short tool life though. If however the bearing hole is made much larger, it extends into the undisturbed region of the rail profile. As a result, the dimensions of the cutting punch are significantly larger and the tool life accordingly longer.

In terms of method, one first makes a bearing hole of the proper size and then, one bends the blank for the bearing block about the bending line, transverse to the direction of displacement, and one thus elaborates a bearing block. The largest part of the bearing hole remains inaccessible for the bearing shaft. The bearing shaft can fit against the undisturbed region of the rail profile. It can be elastically biased so as to adopt a position at a certain distance from this undisturbed region. The distance is small though, it is less than about 2 mm, preferably less than about 1 mm.

Preferably, the rail profile is made from a blank of a flat metal sheet such as sheet steel, using forming steps. In principle, this belongs to prior art. Prior art methods are being utilized. Preferably, the material of the rail profile has a high tensile strength; it should be higher than about 600 N/mm$^2$ and in particular be higher than that, such as at least about 150 N/mm$^2$, or at least about 900 N/mm$^2$. A flat material with such a high tensile strength is quite difficult to bend, in particular if the radii are small. Typically, the metal sheet thickness is about 1.5 mm. On the inner side of a bend, possible bending radii are about 0.75 mm. Bending preferably occurs by overbending and bending back, meaning in the shape of a question mark when viewed in the direction of the bending line.

In some embodiments, the rail profile has a receiving bore for an extension of the bearing shaft.

Other features and advantages of the invention will become more apparent upon reviewing the appended claims and the following non-restrictive description of embodiments of the invention, given by way of example only with reference to the drawings.

The system of coordinates used in the Figs. has an x direction pointing in the direction of travel of the vehicle, a y axis lying in the plane of travel of the vehicle and a z axis pointing vertically upward.

DETAILED DESCRIPTION OF THE INVENTION

Figure 1:
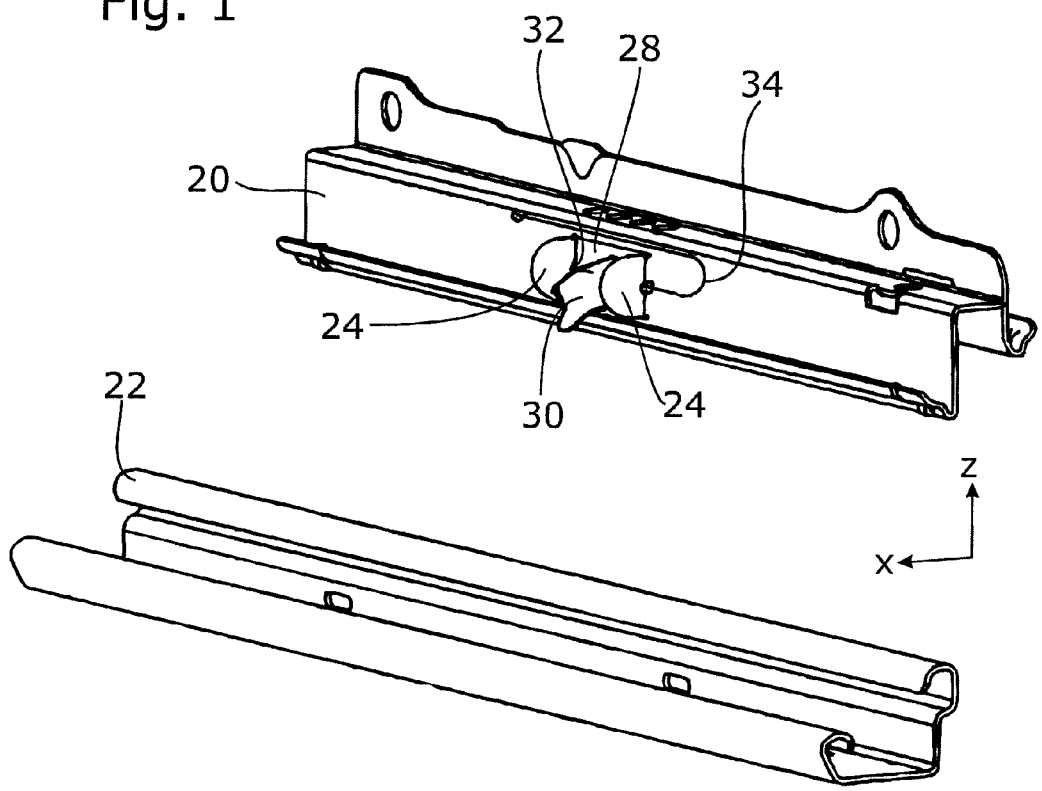
FIG. 1 is a perspective view in the form of an assembly drawing for a pair of rails consisting of a seat rail and of a bottom rail, bearing blocks and a flap being disposed in said seat rail.

FIG. 1 shows two rails of a longitudinal guide, namely a seat rail 20 and a bottom rail 22. This longitudinal guide is provided for longitudinal adjustment of a motor vehicle seat, such a motor vehicle seat belonging to prior art so that it has not been illustrated herein. The seat rail 20 has two bearing blocks 24 that extend transverse to a longitudinal direction of the two rails 20, 22; they are substantially parallel to the y-z plane. Each bearing block 24 comprises a bearing hole 26. Between the two bearing blocks 24 there is an opening 28. A flap 30, which has not been illustrated in details herein, extends through this opening. It allows for transmission of a movement from the outer side of the seat rail 20 into the interior defined by the seat rail 20 and vice versa. It may for example be a stopping device as it has been known from EP 962 356 B1, herein entirely incorporated by reference.

The flap 30 is pivotal about a bearing shaft 32. The bearing shaft 32 extends through the two bearing holes 26, which are aligned. The bearing shaft 32 is an integral portion of a bearing spring 34, which both elastically biases the flap 30 relative to the seat rail 20 in an initial position as shown and realises the bearing shaft. In this context, the reader is referred to the non-published application already mentioned herein above, which bears the priority number DE 10 2008 021 123; the prior art disclosed therein is fully incorporated in the present disclosure.

Figure 6:
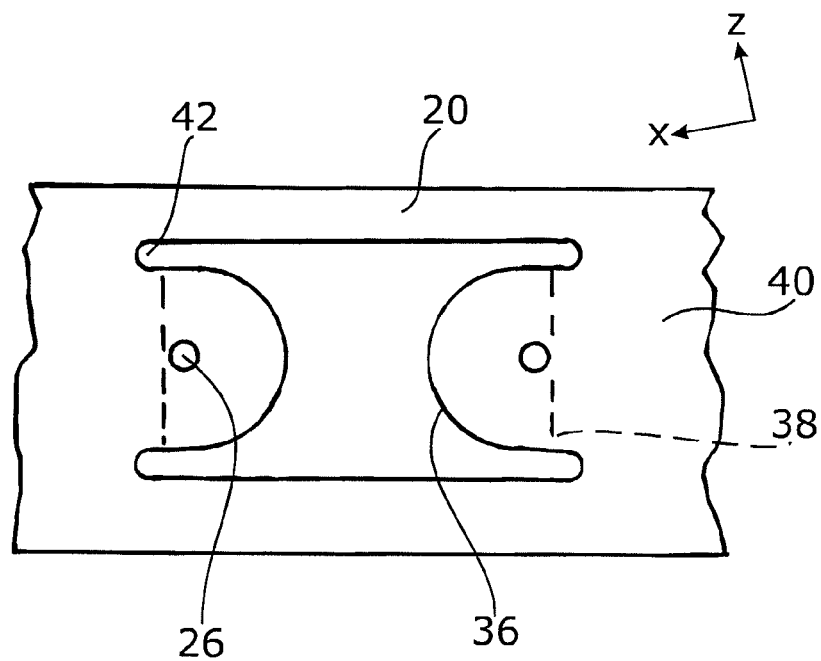
FIG. 6 is a side view like FIG. 3, but for another exemplary embodiment and prior to bending upward the bearing blocks, whose borders have already been cut out.

In order to manufacture such type bearing block, the reader is referred to FIG. 6. FIG. 6 shows a side leg of a rail profile as it can also be seen from FIG. 1 and which carries the opening 28. In the condition shown in FIG. 6 a cutout has been made in a first step; for this purpose, a part with a substantially H-shaped configuration is punched out of the material of the seat rail 20. The punched out part is scrap. One blank has been realized by punching for each of the two bearing blocks. Borders 36 of the future bearing blocks 24 have been elaborated. In a next step, which follows the illustration shown in FIG. 6, the two blanks are respectively bent about a bending line 38, 90° out of the plane of the drawing; two bearing blocks 24 are formed in this way.

Figure 2:
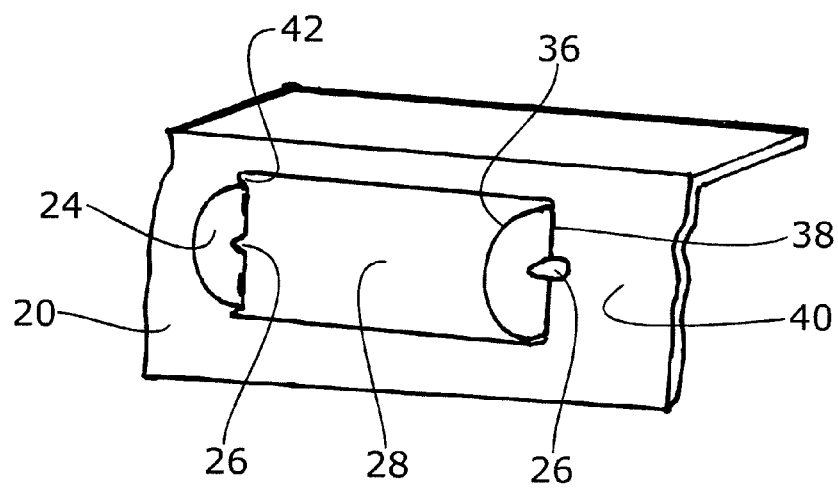
FIG. 2 is a perspective view of a portion of a rail profile with two bearing blocks and with bearing holes provided therein.

The bearing hole 26 has been manufactured before. In the implementation shown in FIG. 6, the bearing holes 26 have been achieved by cutting them out with a laser. In this case, no mechanical punch has been utilized so that no problem arises with respect to tool wear. If however a mechanical punch is being utilized, which is preferred, the bearing holes are significantly larger than they need to be for receiving the bearing shaft 32 and than shown in FIG. 6. The significantly larger shape can be seen from the other Figs., such as FIG. 2. FIG. 2 shows that, in contrast to the round bearing hole shown in FIG. 6, the shape of the bearing hole 26 is approximately in the shape of a drop and is located more than 50%, preferably more than 75%, of its surface beyond the bending line 38, in the undisturbed region 40, the remainder being located in the bearing block 24.

It is preferred to produce the bearing hole 26 as follows: Initially a prehole is produced which is at least 50%, preferably at least 100%, wider than the bearing hole 26. In a next step this prehole is made smaller until it has the dimension of the bearing hole 26. This is performed by cold working, e. g., stamping.

Figure 3:
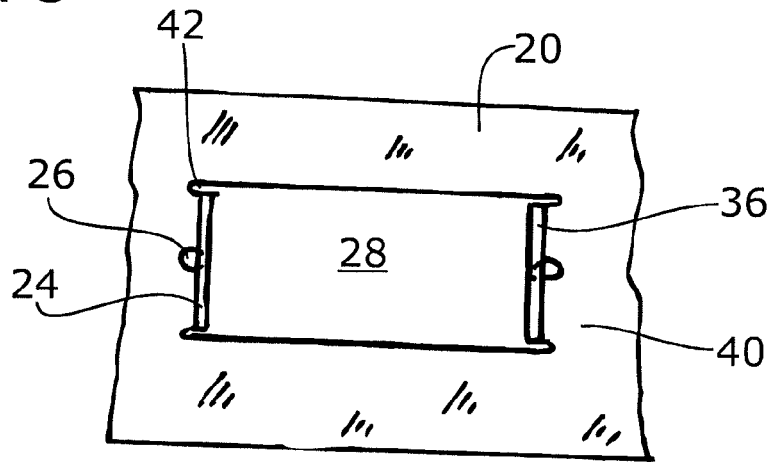
FIG. 3 is a side view of the portion of the rail shown in FIG. 2.
Figure 5:
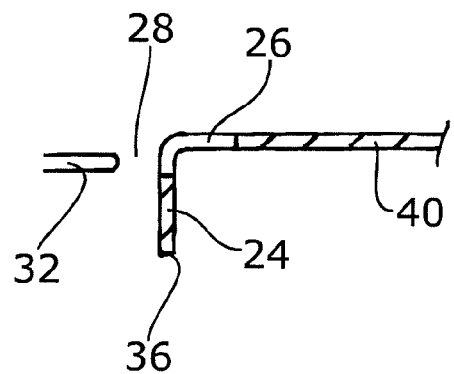
FIG. 5 is a sectional view of a bearing block with an associated, undisturbed region of the rail profile, the section plane being defined by the direction of displacement and a direction parallel to the y direction; there is further shown a portion of a bearing spring, the state being prior to assembly

From FIG. 3 it can be seen that the bending about the bending line 38 can occur along a course that can be designated as an overshooting. This course may also be represented by a question mark. The course is in contrast with the course as it can be seen in FIG. 5 where the bearing block 24 extends at right angles from the undisturbed region 40, with a kink about a chamfer that is as sharp as possible without any overshooting. In FIG. 3 there are illustrated empty regions 42, which are located above and beneath the flap 30 in the z direction, said empty regions 42 occurring because of the overshooting during bending. They can also be provided when the chamfer is right-angled like in FIG. 5.

The dimensions of the bearing blocks 24 correspond to prior art and to the flaps 30 which are to be housed therein between. They may be smaller than in prior art, all the more so since the bearing shaft may be disposed in closer proximity to the undisturbed region. Preferably, the clear distance of the bearing blocks 24 matches the width of the flap 30.

In the region of the bearing block 24, the bearing hole 26 typically has clear dimensions of about 2 mm through about 2.5 mm in the z direction and of about 2 mm through about 3 mm in the y direction. Outside of the bearing block 24, the bearing hole 26 has larger dimensions. In the undisturbed region 40, the clear dimensions have at least about 3 mm in the two directions considered. This is not true for the implementation shown in FIG. 6.

The seat rail 20 is made from a material having a metal sheet thickness of about 1.5 mm. The bending radius on the inner side ranges approximately from about 0.5 mm to about 1 mm. Viewed from the bearing block 24, the bearing shaft 32 extends outward, away from the bearing block 24, over a greater distance than the bearing hole 26. As a result, the bearing shaft 32 is prevented from "falling into" the bearing hole 26.

Figure 4:
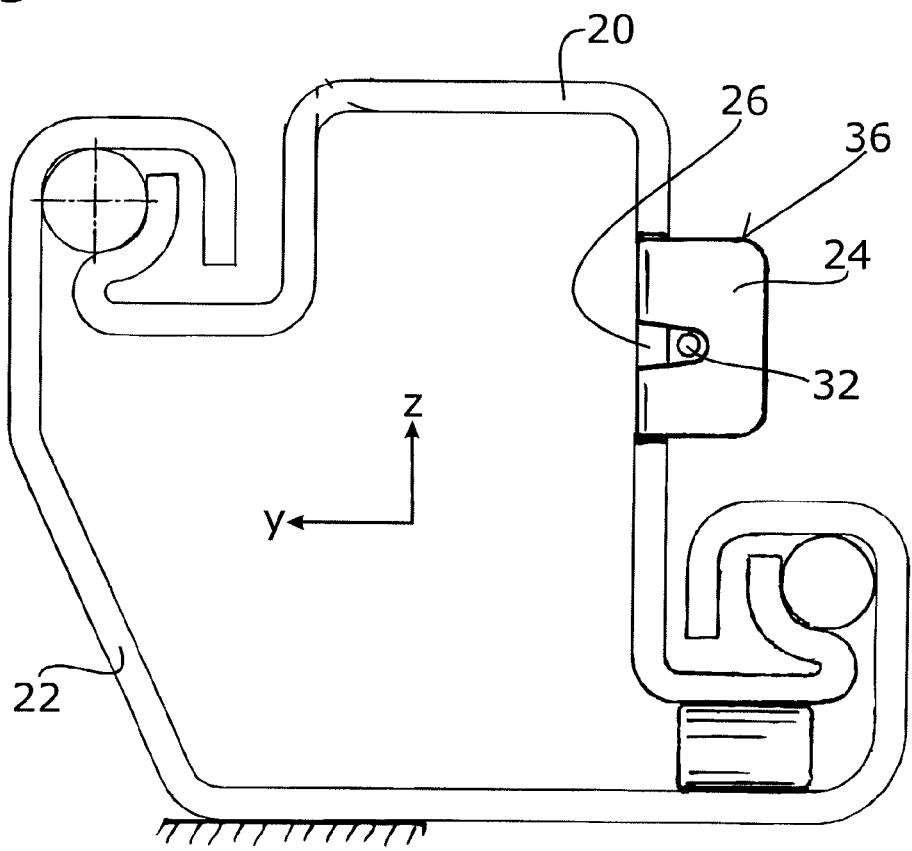
FIG. 4 shows a longitudinal cut parallel to the y-z plane through a longitudinal guide, the section line extending through the opening for the flap in the seat rail.

The correlation between bearing hole 24 and bearing shaft 32 can be seen from FIG. 4. The bearing shaft 32 has a diameter of about 2 mm, it is made from a rod-shaped spring material. Once the bearing block 24 has been made, meaning after the blank has been bent about the bending line 38, the major part of the bearing hole is no longer accessible for the bearing shaft 32, except for FIG. 6. FIG. 4 shows this. The bearing shaft 32 is disposed at a distance from the undisturbed region 40 that may be less than about 2 mm. The bearing shaft 32 may well be in contact with the undisturbed region 40.

As shown in FIG. 1, the bearing spring 34 is substantially U-shaped. After having left the right bearing block 34 on the right side thereof, it passes into a U region where it extends parallel to the bearing shaft 32, above the two bearing blocks 24. At its upper end, it is connected to the seat rail 20. At its other end, it is connected to the flap 30. As a result thereof, the spring load of the flap 30 and the bearing function are achieved concurrently.

The bearing shaft 32 must not be parallel to the direction of displacement like in the exemplary embodiments. It may be disposed at any angle.

It may be readily understood by those having skill in the pertinent art from the present disclosure that any of numerous changes and modifications may be made to the above-described and other non-restrictive embodiments of the present invention without departing from the scope of the invention as defined in the appended claims. Accordingly, this non-restrictive description of embodiments of the invention is to be taken in an illustrative, as opposed to a limiting, sense.

What is claimed is:

1. A rail of a longitudinal guide of a longitudinal adjustment device of a motor vehicle seat, comprising a rail profile, at least one bearing block-comprising a bearing hole, a bearing shaft extending through said bearing hole and a flap, which is pivotal about said bearing shaft, wherein said bearing block is made from the material of the rail profile by cutting out a border of said bearing block and by bending a blank for said bearing block about a bending line.

2. The rail as set forth in claim 1, wherein the bearing hole extends through the bending line into an undisturbed region of the rail profile.

3. The rail as set forth in claim 2, wherein a portion of the bearing hole located in the undisturbed region of the rail profile is larger than a portion located in the bearing block.

4. The rail as set forth in claim 1, wherein the rail profile is made from a flat material.

5. The rail as set forth in claim 1, wherein the material of the rail profile has a tensile strength higher than about 600 N/mm$^2$.

6. The rail as set forth in claim 1, wherein the bearing shaft has a diameter of less than about 2.5 mm.

7. The rail as set forth in claim 1, wherein the bearing shaft has spring properties.

8. The rail as set forth in claim 1, further comprising two bearing blocks located opposite to each other and having parallel bending lines.

9. The rail as set forth in claim 1, wherein the cutout is substantially in the shape of a H.

10. The rail as set forth in claim 1, wherein the bearing shaft extends outwardly away from said bearing block past the bearing hole.

11. The rail as set forth in claim 1, wherein the rail profile has a receiving bore for an extension of the bearing shaft.

12. The rail as set forth in claim 1, wherein a distance between the bearing shaft and an outer surface of the rail profile is smaller than a diameter of the bearing shaft.

13. The rail as set forth in claim 1, wherein the material of the rail profile has a tensile strength higher than about 750 N/mm$^2$.

14. The rail as set forth in claim 1, wherein the material of the rail profile has a tensile strength higher than about 900 N/mm$^2$.

15. The rail as set forth in claim 1, wherein the bearing shaft has a diameter of less than about 2 mm.

* * * * *